(12) United States Patent
Mohamed et al.

(10) Patent No.: US 10,354,677 B2
(45) Date of Patent: Jul. 16, 2019

(54) SYSTEM AND METHOD FOR IDENTIFICATION OF INTENT SEGMENT(S) IN CALLER-AGENT CONVERSATIONS

(71) Applicants: Nuance Communications, Inc., Burlington, MA (US); International Business Machines Corporation, Armonk, NY (US)

(72) Inventors: Shajith Ikbal Mohamed, Chennai (IN); Kenneth W. Church, Yorktown Heights, NY (US); Ashish Verma, New Delhi (IN); Prasanta Ghosh, Howrah (IN); Jeffrey N. Marcus, Newton, MA (US)

(73) Assignees: Nuance Communications, Inc., Burlington, MA (US); International Business Machines Corporation, Armonk, NY (US)

( * ) Notice: Subject to any disclaimer, the term of this patent is extended or adjusted under 35 U.S.C. 154(b) by 156 days.

(21) Appl. No.: 13/781,351

(22) Filed: Feb. 28, 2013

(65) Prior Publication Data

US 2014/0244249 A1 Aug. 28, 2014

(51) Int. Cl.
*G06F 17/27* (2006.01)
*G10L 25/63* (2013.01)
*G10L 15/08* (2006.01)

(52) U.S. Cl.
CPC .............. *G10L 25/63* (2013.01); *G10L 15/08* (2013.01); *G06F 17/2775* (2013.01); *G06F 17/2785* (2013.01); *G10L 2015/088* (2013.01)

(58) Field of Classification Search
None
See application file for complete search history.

(56) References Cited

U.S. PATENT DOCUMENTS

| | | | |
|---|---|---|---|
| 5,357,596 A * | 10/1994 | Takebayashi et al. | 704/275 |
| 5,457,768 A * | 10/1995 | Tsuboi et al. | 704/231 |
| 6,073,091 A * | 6/2000 | Kanevsky et al. | 704/9 |
| 6,167,377 A * | 12/2000 | Gillick et al. | 704/240 |
| 7,634,406 B2 * | 12/2009 | Li | G10L 15/19 704/243 |
| 7,751,551 B2 * | 7/2010 | Bushey et al. | 379/265.02 |
| 8,275,608 B2 * | 9/2012 | Ah-Pine et al. | 704/9 |
| 8,503,662 B2 * | 8/2013 | Bushey et al. | 379/265.02 |

(Continued)

*Primary Examiner* — Richard Z Zhu
(74) *Attorney, Agent, or Firm* — Hamilton, Brook, Smith & Reynolds, P.C.

(57) ABSTRACT

Identification of an intent of a conversation can be useful for real-time or post-processing purposes. According to example embodiments, a method, and corresponding apparatus of identifying at least one intent-bearing utterance in a conversation, comprises determining at least one feature for each utterance among a subset of utterances of the conversation; classifying each utterance among the subset of utterances, using a classifier, as an intent classification or a non-intent classification based at least in part on a subset of the at least one determined feature; and selecting at least one utterance, with intent classification, as an intent-bearing utterance based at least in part on classification results by the classifier. Through identification of an intent bearing utterance, a call center for example, can provide improved service for callers through, for example, more effective directing of a call to a live agent.

9 Claims, 7 Drawing Sheets

(56) References Cited

U.S. PATENT DOCUMENTS

| | | | |
|---|---|---|---|
| 8,566,094 B2 * | 10/2013 | Minamino et al. ........... | 704/251 |
| 8,700,404 B1 * | 4/2014 | Chotimongkol .... | G10L 15/1815 |
| | | | 704/255 |
| 2003/0154072 A1 * | 8/2003 | Young ............... | G06F 17/30017 |
| | | | 704/9 |
| 2004/0220809 A1 * | 11/2004 | Wang ................. | G06F 17/2705 |
| | | | 704/257 |
| 2005/0187767 A1 * | 8/2005 | Godden ........................ | 704/238 |
| 2006/0122834 A1 * | 6/2006 | Bennett ........................ | 704/256 |
| 2006/0149544 A1 * | 7/2006 | Hakkani-Tur et al. ....... | 704/236 |
| 2010/0169095 A1 * | 7/2010 | Asano .......................... | 704/251 |
| 2010/0250529 A1 * | 9/2010 | Surendran .............. | G06Q 30/02 |
| | | | 707/732 |
| 2011/0145285 A1 * | 6/2011 | Gustafson .............. | G06Q 30/02 |
| | | | 707/776 |
| 2011/0238409 A1 * | 9/2011 | Larcheveque et al. .......... | 704/9 |
| 2012/0226492 A1 * | 9/2012 | Tsuboi et al. .................... | 704/9 |
| 2014/0079195 A1 * | 3/2014 | Srivastava ............. | G06F 17/21 |
| | | | 379/88.01 |
| 2014/0172899 A1 * | 6/2014 | Hakkani-Tur ......... | G06N 7/005 |
| | | | 707/759 |

\* cited by examiner

210

212a — A: hello, thank you for calling xyz company my name is John Doe i d number is 12345 how can I help you 212b — C: yeah I just wanted to reset my voicemail password ←214

A: okay I'll be happy to assist you in resetting your voicemail password may I please have your phone number C: it's 123456789

212a — A: thank you may have the name on the account please

212b — C: Mary Smith

A: thank you your security code please

C: it's 987654321

212a — A: thank you [u] who am I speaking with

212b — C: Mary Smith

|  | Scores | | A1 | A2 | A3 | A4 | Intent Classification Occurrence | Rank |
|---|---|---|---|---|---|---|---|---|
|  | Intent | Non-intent | 422 | 424 | 426 | 428 | 430 | 440 |
| U1 | 1 | 9 | N(9) | N(9) | N(9) | N(9) | 0 | 4 |
| U2 | 9 | 1 | I(9) | I(9) | I(9) | I(9) | 4 | 1 |
| U3 | 7 | 3 | I(7) | I(7) | N(3) | N(3) | 2 | 2 |
| U4 | 4 | 6 | N(6) | I(4) | N(6) | I(4) | 2 | 3 |
| U5 | 1 | 9 | N(9) | N(9) | N(9) | N(9) | 0 | 5 |
| U6 | 1 | 9 | N(9) | N(9) | N(9) | N(9) | 0 | 6 |
| Cumulative Score | | | 49 | 47 | 45 | 43 | | |

FIG. 4

| Method | 1 utterance | 2 utterances | 3 utterances |
|---|---|---|---|
| 1) Select first K utterances (Baseline) | 82.2% | 86.7% | 92.9% |
| 2) CRF trained with 50 calls | 89.3% | 95.0% | 97.2% |
| 3) CRF trained with 300 calls | 92.2% | 96.4% | 97.5% |

FIG. 5

SYSTEM AND METHOD FOR IDENTIFICATION OF INTENT SEGMENT(S) IN CALLER-AGENT CONVERSATIONS

BACKGROUND OF THE INVENTION

Call centers receive huge numbers of calls on daily basis. Many of the received calls are recorded or transcribed into textual documents. The content of the received calls is of great value to companies and entities associated with the call centers. As such, processing the recorded or transcribed calls is of interest to such entities.

SUMMARY OF THE INVENTION

According to an example embodiment, a method and corresponding apparatus of identifying at least one intent-bearing utterance in a conversation, includes determining at least one feature for each utterance among a subset of utterances of the conversation; classifying each utterance among the subset of utterances, using a classifier, as an intent classification or a non-intent classification based at least in part on a subset of the at least one determined feature; and selecting at least one utterance, with intent classification, as an intent-bearing utterance based at least in part on classification results by the classifier.

According to another example embodiment, the method and the corresponding apparatus further comprise assigning a score for said each utterance of the subset of utterances based at least in part on the determined feature(s). The score may be a statistical measure of how likely a particular utterance is intent-bearing or non-intent bearing.

According to yet another example embodiment, the method and corresponding apparatus further comprise generating a plurality of state sequences, each state sequence describing a sequence of classifications associated with the subset of utterances. The generated plurality of state sequences represent, for example, the most likely possible classification sequences of the subset of utterances. According to at least one aspect, the plurality of state sequences is generated based on maximization of cumulative scores assigned to utterances with corresponding classifications.

The selection of utterances as intent-bearing utterances may be performed based on the scores assigned to utterances, generated state sequences, or a combination thereof. For example, utterances with a highest intent classification occurrence, among generated state sequences with highest cumulative scores, may be selected.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2 is a representation of an example conversation between two parties that may be processed by an embodiment of the invention.

FIG. 4 is a table illustrating an example approach of selecting at least one utterance as an intent-bearing utterance.

FIG. 5 is a table illustrating example simulation results.

DETAILED DESCRIPTION OF THE INVENTION

Figure 1:
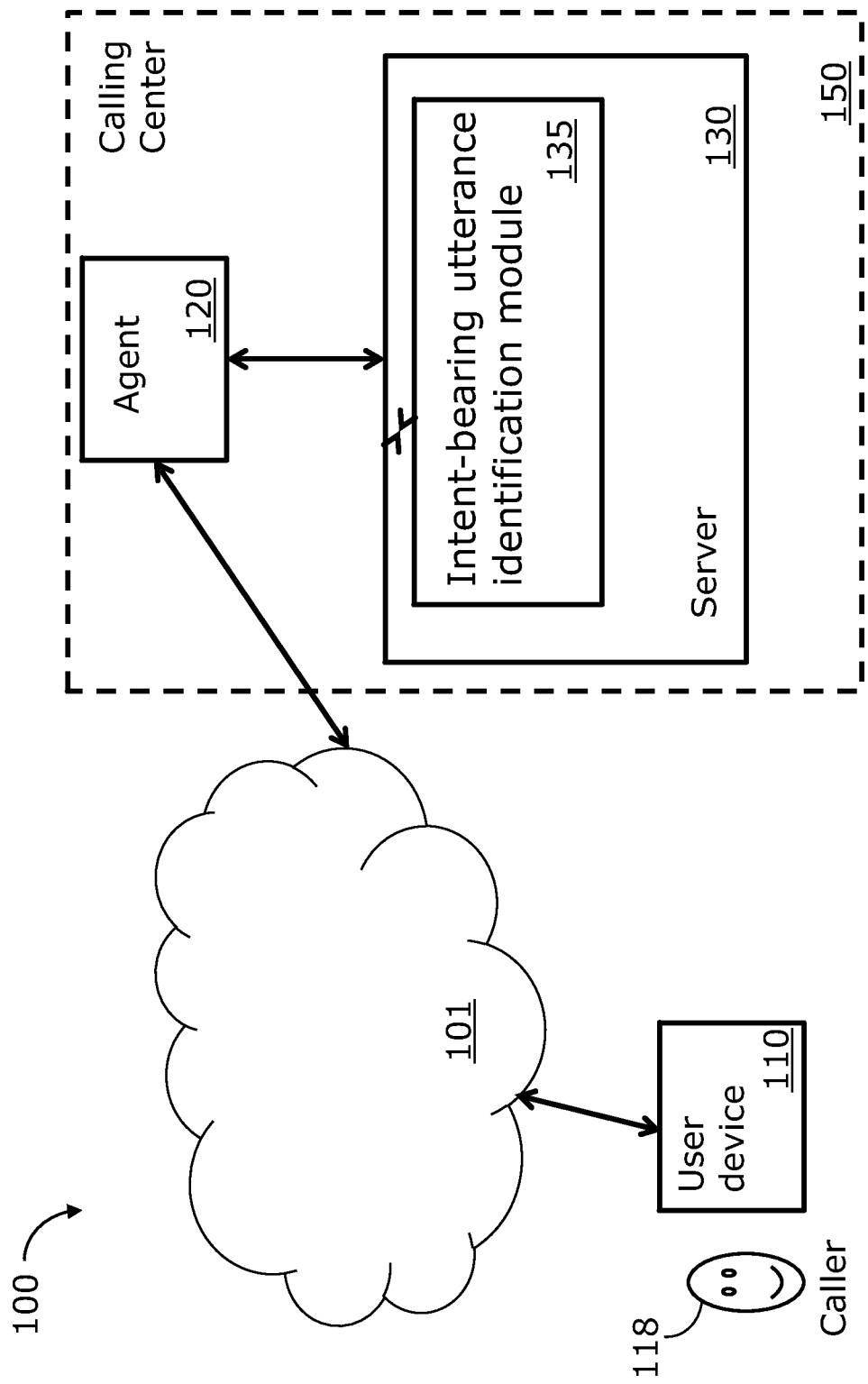
FIG. 1 is an environment in which example embodiments may be implemented.

A description of example embodiments of the invention follows.

In call centers, a large number of conversations with customers are processed on a daily basis. Processing such conversations includes, for example, forwarding a call based on a first conversation with an automatic operator, classifying conversations, archiving conversations, generating statistical data describing common problems callers are calling about, or the like. The subject or the intent of conversations is usually used in processing the conversations. With regard to customer service calls, for example, identifying the intent of a call facilitates forwarding, classifying, or archiving the call. Given the typical large number of conversations handled by customer service centers, automating intent identification improves the speed of processing conversations.

In general, identification of a caller's intent facilitates designing various customer relationship management (CRM) processes or applications. Identifying a caller's intent is an important step in determining customers' concerns or complaints with regard to a respective service or product. Knowing a call's intent also facilitates improving customer satisfaction and enhances up-selling or cross-selling. For example, forwarding a customer's call to the appropriate agent in a reliable and fast manner makes it more likely for the customer to be served quickly and leads to efficient use of agents and other resources. Furthermore, determining the intents of customer calls enables classification of the calls and generation of statistical data. The statistical data generated is usually used to assess customer satisfaction and to identify strength or shortcomings associated with a service or product provided to customers.

Identification of a call's intent may be achieved through different approaches. According to an example existing approach, a whole call is classified into one intent class among many intent classes using standard text classification. Such intent classes describe the different reasons for which a caller makes a call. According to another existing approach, each utterance of a caller is classified into one intent class among many intent classes describing the different reasons for which callers usually make calls. In yet another example existing approach, a summary or abstract is usually generated to summarize a caller-agent conversation.

In the following, example embodiments for identifying an intent-bearing utterance, or segment, within a caller-agent conversation are presented. Embodiments of processing a call to identify one or more segments or utterances in the call that convey the intent of the caller, e.g., the reason why the caller initiated the call, are described. Given a call, a segment or utterance is identified as carrying the caller's intent. The identification of the intent-bearing utterance, or segment, is performed, for example, based on characteristics or features extracted from different utterances, or segments, of the call.

FIG. 1 is an environment 100 in which example embodiments may be implemented. The environment 100 includes a user device 110 associated with a caller 118. The user device 110 may be, for example, a phone, wireless phone, smart phone, tablet computer, wireless device, computer, or the like. The user device 110 is connected to a calling center 150 through a communications network 101. Using the user device 110, the caller is enabled to make a call to the calling center 150. The example calling center 150 includes at least one agent 120, referred to hereinafter as the agent 120, and at least one server 130, referred to hereinafter as the server 130. The agent 120 is configured to respond to calls. According to at least one example embodiment, the agent 120 may be a human agent answering calls from callers. In at least one other example embodiment, the agent 120 is an automatic answering device or module, or interactive voice response (IVR) system.

A record (not shown) of the conversation between the caller 118 and the agent 120 is then processed by a server 130 to identify at least one intent-bearing utterance, or segment, of the conversation. The conversation record may be, for example, a textual transcript of the conversation between the caller 118 and the agent 120. Records of the conversation may be stored in a memory (not shown) accessible by the server 130.

The server 130 may include and intent-bearing utterance identification module 135 configured to identify the at least one intent-bearing utterance. The intent-bearing utterance identification module 135 may be implemented, for example, as computer code instructions that are executed by a processor (not shown) of the server 130.

FIG. 2 illustrates an example of a conversation 200 between a caller 118 and an agent 120. The conversation 200 includes ten utterances 210, or segments, with five utterances 212a associated with the agent and denoted with "A," and five utterances 212b associated with the caller and denoted with "C." Hereinafter, an utterance 210 is defined as a set of one or more words. In the example conversation 200 illustrated in FIG. 2, each utterance 210 includes a set of words pronounced by the caller 118 or the agent 120. The underlined utterance 214, in FIG. 2, is the intent-bearing utterance.

According to example embodiments, an intent-bearing utterance is identified based on features determined from the conversation. For a particular utterance, words or expressions, in the particular utterance, indicative of intent content may be used as features to determine whether the particular utterance is intent-bearing. Other example features include: the identity of the entity associated with the utterance, e.g., caller or agent, the position of the utterance within the conversation, words or expressions in utterances located before or after the particular utterance within the conversation, or the like.

In typical conversations between a caller and an agent, intent is usually expressed in the beginning of the conversation, and, as such, intent-bearing utterances are more likely to be in the beginning of the conversation than at the end of the conversation. Also, intent is more likely to be expressed by the caller than the agent. The intent may also be expressed by the agent. For example, after the caller states the intent, the agent may reaffirm the intent of the conversation, as is the case in the example in FIG. 2. Also, according to the example in FIG. 2, an expression such as "how can I help you" usually appears in the conversation within the utterance preceding the intent-bearing utterance, whereas an expression like "okay I'll be happy to assist you" usually appears in the conversation within an utterance following the intent-bearing utterance. Also, expressions frequently used, when stating the intent of the conversation by the caller, include "I want to . . . ," "I am calling to . . . ," "I would like to . . . ," or other similar expressions. Words or expressions frequently used before, after, or when intent is expressed are used as features to identify intent-bearing utterance(s). Such features may be extracted or detected in utterances checked for intent.

Figure 3A:
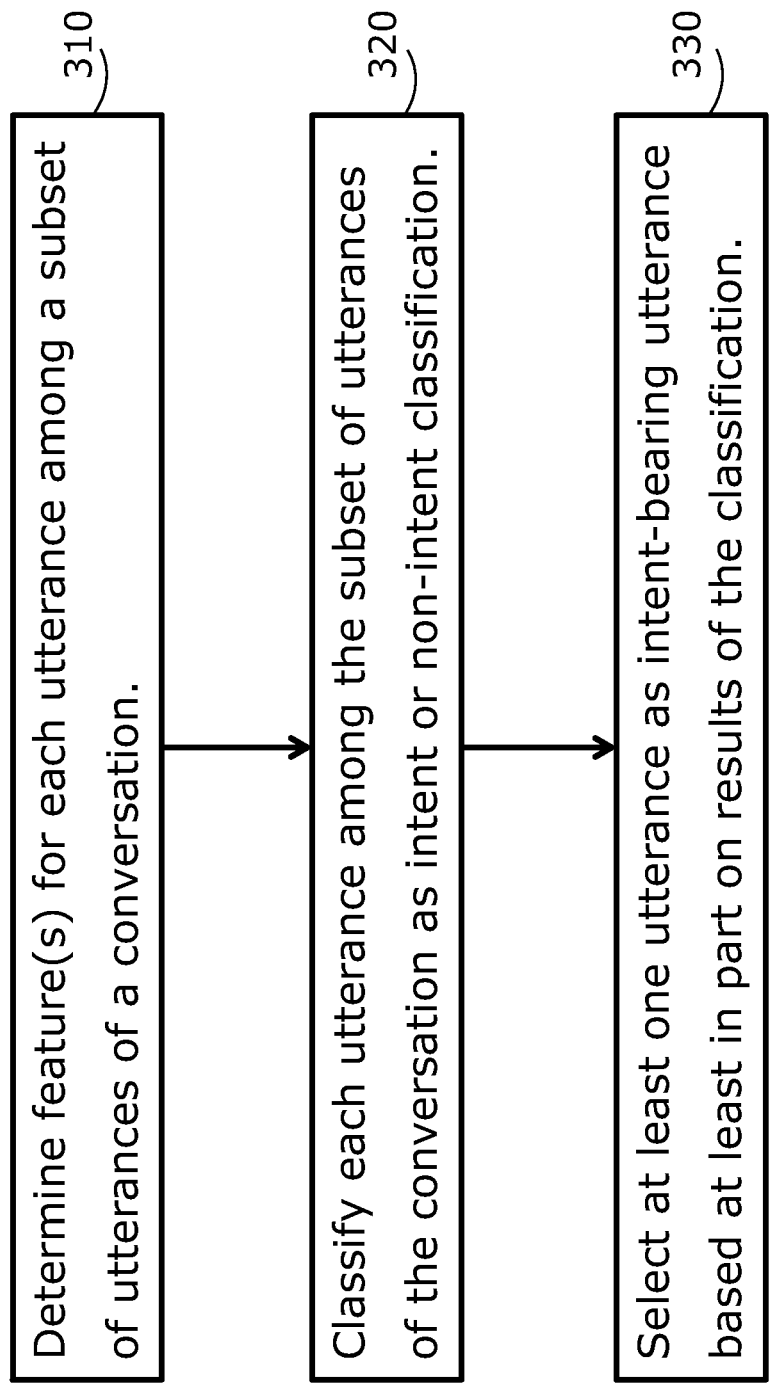
FIGS. 3A-3C are flow charts illustrating methods according to example embodiments of the present invention.

FIG. 3A shows a flowchart illustrating a method of identifying at least one intent-bearing utterance in a conversation according to at least one example embodiment. At block 310, one or more features are determined for each utterance among a subset of utterances of the conversation. The subset of utterances may, for example, include all or just a few of the utterances of the conversation. For example the subset of utterances may be the first few utterances in the conversation. Example features include a position of the utterance within an order of the utterances, within the conversation, the identity of the entity associated with, i.e., who made, the utterance, words or expressions frequently used, words or expressions frequently used in utterances preceding or following intent-bearing utterance(s), words or expressions frequently used within intent-bearing utterances, or the like. Words or expressions frequently used within, prior to, or following intent bearing utterances may be defined and provided to the classifier manually using rules or automatically in a data-driven manner. For example, such words or expression may be identified from a set of conversations using methods such as frequent phrase extraction. At least one feature for each utterance is determined, using words in the utterance, position of utterance with in the call, identity of the speaker, words or expressions frequently used by the customer or customer service representative within the intent bearing utterance or in utterances prior to that or utterances after that found manually through rules or identified in a data-driven manner using methods such as frequent phrase extraction.

At block 320, each of the utterances among the subset of utterances is classified within "intent" or "non-intent" classification based at least in part on the corresponding determined features. According to an example embodiment, a conditional random field (CRF) classifier is used to classify utterances as intent or non-intent classifications. According to at least one other example embodiment, other statistical or rule based classifiers may be used. At block 330, at least one utterance is selected as intent bearing utterance based at least in part on results of the classification. For example, utterances that are classified as intent, more frequently than others, are selected as intent bearing utterances.

Figure 3B:
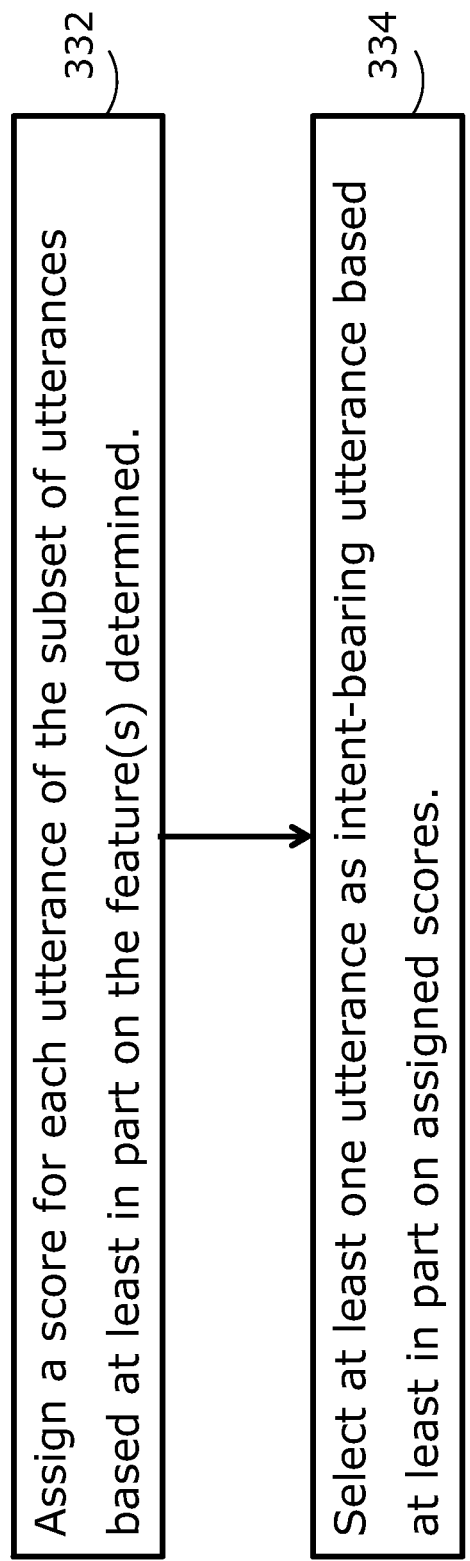

FIG. 3B shows another flowchart illustrating an example implementation of the selection of an utterance as intent-bearing utterance. In other words, the method illustrated in FIG. 3B represents an example implementation of block 330 in FIG. 3A. After classifying utterances, a score is assigned to each utterance, among the subset of utterances, based at least in part on the classification results 332. The score assigned to a particular utterance is indicative, for example, of the probability or likelihood of the particular utterance being intent-bearing or non-intent-bearing. The score may also be indicative of the occurrences of "intent" and "non-intent" classifications for the particular utterance. For example, the output of the classifier may be in the form of probabilities of "intent" and "non-intent" classifications for each of the utterances of the subset of utterances. Alternatively, the classifier may provide a plurality of classified sequences, or alignments, of utterances and, as such, the score of a particular utterance indicates the number of occurrences of "intent" classification and "non-intent" classification of the particular utterance within the plurality of classified sequences provided by the classifier.

At block 334, at least one utterance is selected as intent-bearing based at least in part on the assigned scores to the subset of utterances. For example, the utterance(s) with highest probability, or occurrence, of "intent" classification is/are selected as intent-bearing utterance(s). A single utterance may be selected as the intent-bearing utterance. Alternatively, more than one utterance may be selected as intent-bearing utterances.

Figure 3C:
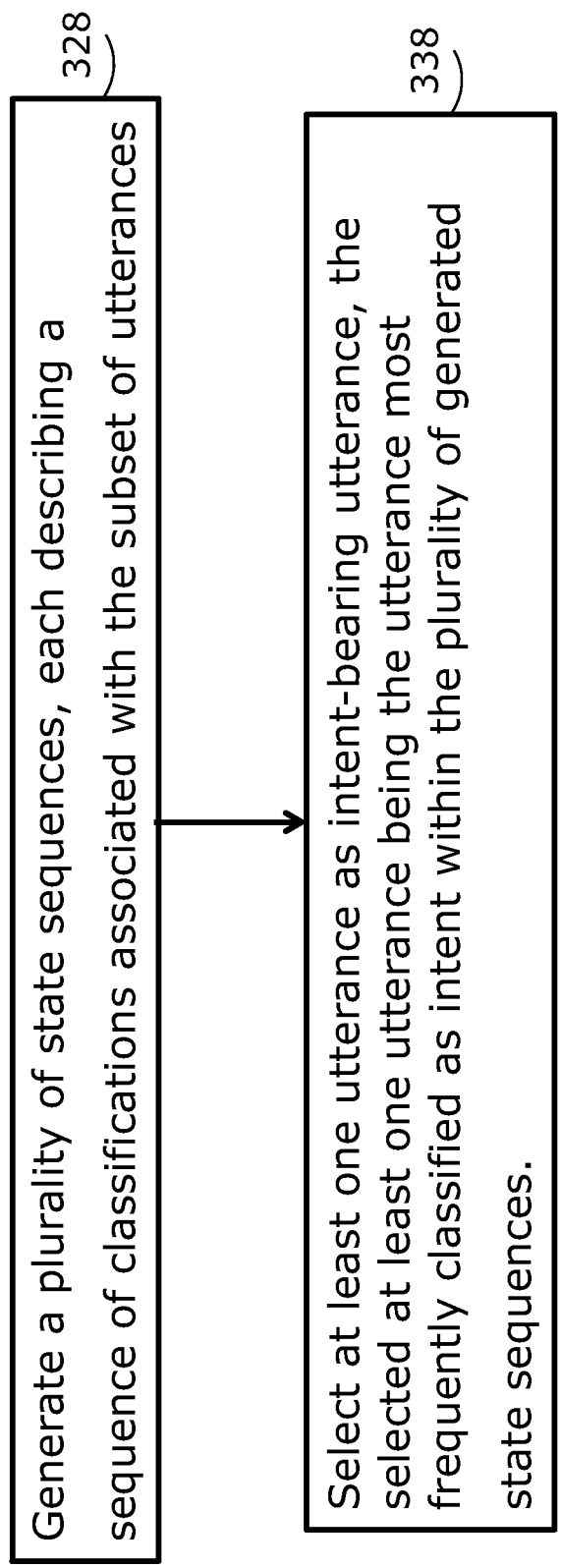

FIG. 3C shows yet another flowchart illustrating another example implementation of classification 320 and selection 330 in the method described in FIG. 3A. At block 328, a plurality of state sequences are generated, for example, by the classifier. Each state sequence is a sequence of "intent" and "non-intent" states associated with the utterances in the subset of utterances. An utterance that is classified as "intent" in a large number of state sequences is more likely to be intent-bearing than an utterance that is classified as intent-bearing in none or few state sequences. At block 338, the utterance(s) that is/are most frequently classified as "intent" within the generated state sequences is/are selected as intent-bearing utterance(s).

According to another example implementation of the method described in FIG. 3A, both the operations in both FIGS. 3B and 3C may be employed. For example, in generating the plurality of state sequences at 328, multiple classifications are performed resulting in multiple sequences of "intent" and "non-intent" states corresponding to the sequence of utterances in the conversation. Within each of the resulting sequences of "intent" and "non-intent" states, a score is assigned to each utterance classification, or state, based on the occurrence of the same utterance classification within the resulting sequences. A subset of the resulting sequences of "intent" and "non-intent" states is then selected based cumulative scores of corresponding states. An utterance may then be selected as intent-bearing utterance based on the occurrence of "intent" classification for the same utterance within the selected subset of state sequences. An utterance may also be selected as intent-bearing utterance based on the occurrence of "intent" classification for the same utterance within all the multiple state sequences.

FIG. 4 is a table illustrating an example implementation of the classification and selection of utterances within a conversation. The table of FIG. 4 refers to six utterances, indicated as "U1," "U2," "U3," "U4," "U5," and "U6." Each utterance is assigned a score including two numbers, for example. For each utterance, the first number is a measure of the likelihood of "intent" classification, whereas the second number represents a measure of the likelihood of "non-intent" classification. Example measures of likelihood include a statistical probability, a number of occurrences of a classification for a particular utterance, or the like. For example, in FIG. 4 the first utterance "U1" has an "intent" classification score equal to one and a "non-intent" classification score equal to nine (see columns 414 and 418 of FIG. 4). The second utterance "U2" has an "intent" classification score equal to nine and a "non-intent" classification score equal to one. The scores shown in columns 414 and 418 represent, for example, classification confidence scores. According to one example embodiment, the selection of an utterance as being intent-bearing may be done based on the assigned scores. For example utterances "U2" and "U3," having the highest "intent" scores, e.g., 9 and 7, respectively, as shown in column 414, may be selected as being intent bearing utterances.

According to another example embodiment, a plurality of state sequences are generated. The table in FIG. 4 shows four state sequences referred to as "A1," "A2," "A3," and "A4," shown in columns 422, 423, 424, and 428. Each utterance within the state sequences "A1," "A2," "A3," and "A4" is assigned a score, for example, representing the occurrence frequency of the corresponding state, e.g., "intent" or "non-intent" for the same utterance within the ten generated state sequences. Each utterance within the state sequences "A1," "A2," "A3," and "A4" is assigned a score, for example, representing the confidence score of the corresponding state. Each of the state sequences "A1," "A2," "A3," and "A4" is assigned a cumulative score defined, for example, as the sum of scores associated with the different utterances. The state sequences "A1," "A2," "A3," and "A4" are assigned the cumulative scores 49, 47, 45, and 43, respectively. For example, the state sequence "A1" assigns the sequence of classifications "non-intent," "intent," "intent," "non-intent," "non-intent," and "non-intent," respectively, to the utterances "U1 . . . U6." Adding the scores corresponding to the classifications assigned to the utterances "U1" through "U6," a cumulative score to the state sequence "A1" is equal to 49. The state sequences "A1," "A2," "A3," and "A4" are selected as the high scoring state sequences among all possible state sequences.

Among the four generated state sequences, the number of occurrences of the "intent" classification is counted for each utterance and the utterance(s) with highest occurrences of "intent" classification is/or ranked highest, e.g., the first and selected as intent-bearing utterance(s). At column 430, the number of occurrence of "intent" classification, within the state sequences "A1," "A2," "A3," and "A4," for each of the utterances "U1," "U2," "U3," "U4," "U5," and "U6," is recorded. At column 440, the utterances "U1," "U2," "U3," "U4," "U5," and "U6" are ranked based on the recorded numbers of occurrence of "intent" classification in column 430. For example the utterance "U2" has the highest "intent" classification occurrence, which is equal to four which is the highest number and hence is ranked one, or the first. The utterances "U3" and "U4" have the second highest "intent" classification occurrence, equal to two. Based on the "intent" classification occurrence among the state sequences "A1," "A2," "A3," and "A4," the utterance "U3" is ranked second, or two, and is selected as being intent-bearing utterance. If two utterances, e.g., U3 and U4, get the same score, then one of U3 and U4 may be ranked higher and selected. According to one example embodiment, "U3" may be prioritized and ranked higher, over "U4," because utterances occurring early in the call are more likely to be intent bearing. Alternatively, "U4" may be selected as the second intent-bearing utterance using some other criteria, for example, choosing an utterance from the caller or customer over the utterance from the agent.

Assuming that scores assigned to utterances represent likelihood measures of "intent" and "non-intent" classifications, state sequences with highest cumulative scores represent classification sequences with highest likelihood. As such, utterances with high "intent" classification occurrence, among generated state sequences with highest cumulative scores, represent most likely utterances to be intent-bearing among most likely classification events.

FIG. 5 is a table illustrating simulation results for three methods for identifying intent-bearing utterance(s) in a conversation. In the first method entitled "Select first K utterances," the first K utterances in the customer-agent conversation, starting from the first utterance spoken by the customer, are chosen. This is based on the assumption that the caller's intent is typically conveyed early in the conversation. Hence the first K utterances would likely capture the intent conveyed. The second and third methods entitled "CRF trained with 50 calls" and "CRF trained with 300 calls," respectively, represent example embodiments of the method proposed herein. In these methods, conditional random field (CRF) is used to perform intent classification and assign sequence of intent labels to all utterances in the conversation. In the second method, CRF is trained using 50 manually labeled conversations while in the third method 300 calls are used for training.

The results presented in the table of FIG. 5 correspond to three scenarios. In the first scenario, shown in the second column of the table, a single utterance is selected as intent-bearing. In the second scenario, shown in the third column of the table, two utterances are selected as intent-bearing. In the third scenario, shown in the fourth column of the table, three utterances are selected as intent-bearing. The simulation results are expressed in terms of success rate, percentage, in identifying intent-bearing utterances.

It should be understood that the example embodiments described above may be implemented in many different ways. In some instances, the various methods and machines described herein may each be implemented by a physical, virtual or hybrid general purpose computer having a central processor, memory, disk or other mass storage, communication interface(s), input/output (I/O) device(s), and other peripherals. The general purpose computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., that enables the transfer of information between the elements. One or more central processor units are attached to the system bus and provide for the execution of computer instructions. Also attached to system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a computer readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transitory machine-readable medium, which may be read and executed by one or more processors. A non-transient machine-readable medium may include any mechanism for storing or transmitting information in a form readable by a machine, e.g., a computing device. For example, a non-transient machine-readable medium may include read only memory (ROM); random access memory (RAM); magnetic disk storage media; optical storage media; flash memory devices; and others.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method of identifying at least one intent-bearing utterance in a conversation between a human agent, associated with a call center, and a caller, the method comprising:

determining a plurality of features for each utterance among a set of utterances of the conversation between the human agent and the caller, the features including one of an identity associated with the utterance between the human agent and the caller, a position of the utterance within the conversation, and a word located before or after the utterance within the conversation;

classifying each utterance among the set of utterances, using a classifier, as an intent-bearing classification or a non-intent-bearing classification by generating multiple state sequences for each set of utterances, each state sequence including a plurality of states, each of the plurality of states corresponding to a respective utterance among the set of utterances and each of the plurality of states representing a probability that the respective utterance is intent-bearing, each utterance being associated with respective probabilities of the multiple state sequences;

generating a ranking of each utterance based on a combination of the respective probabilities of the multiple state sequences, the ranking being a relative measure that the respective utterance is intent-bearing; and marking, in a customer relationship management (CRM) system, each utterance as being an intent-bearing utterance representing an intent of the conversation based on the ranking.

2. The method according to claim 1, wherein selecting at least one utterance includes:

selecting the at least one utterance based on a highest occurrence of intent-bearing classification among the multiple probabilities being above a particular threshold.

3. The method according to claim 1, wherein the word or expression frequently used prior to, within, or following an intent bearing utterance being provided to the classifier manually through rules or automatically identified in a data driven manner.

4. The method of claim 1, wherein:
the features include two or more of the following: an identity associated with the utterance between the human agent and the caller, the position of the utterance within the conversation, and the word located before or after the utterance within the conversation; and wherein
classifying each utterance further includes classifying each utterance among the set of utterances, using a classifier, as an intent-bearing classification or a non-intent-bearing classification based on the two or more determined features.

5. An apparatus for identifying at least one intent-bearing utterance in a conversation between a human agent, associated with a call center, and a caller, the apparatus comprising:
a memory with computer code instructions stored thereon; and
a processor,
the memory, with the computer code instructions, and the processor being configured to:
determine a plurality of features for each utterance among a set of utterances of the conversation between the human agent and the caller, the features including one of an identity associated with the utterance between the human agent and the caller, a position of the utterance within the conversation, and the word located before or after the utterance within the conversation;
classify each utterance among the set of utterances, using a classifier, as an intent-bearing classification or a non-intent-bearing classification by generating multiple state sequences for each set of utterances, each state sequence including a plurality of states, each of the plurality of states corresponding to a respective utterance among the set of utterances and each of the plurality of states representing a probability that the respective utterance is intent-bearing, each utterance being associated with respective probabilities of the multiple state sequences;
generate a ranking of each utterance based on a combination of the respective probabilities of the multiple state sequences, the ranking being a relative measure that the respective utterance is intent-bearing; and
select an utterance as being an intent-bearing utterance representing an intent of the conversation based on the ranking.

6. The apparatus according to claim 5, wherein in selecting at least one utterance the memory with the computer code instructions and the processor are configured to:
select the at least one utterance based on a highest occurrence of intent-bearing classification among the multiple probabilities being above a particular threshold.

7. The apparatus according to claim 5, wherein the word or expression frequently used prior to, within, or following an intent bearing utterance being provided to the classifier manually through rules or automatically identified in a data driven manner.

8. A non-transitory computer-readable medium for identifying at least one intent-bearing utterance in a conversation between a human agent associated with a call center, and a caller, the non-transitory computer-readable medium includes computer code stored thereon, the computer code when executed by a processor causes an apparatus to perform at least the following:
determining a plurality of features for each utterance among a set of utterances of the conversation between the human agent and the caller, the features including one of an identity associated with the utterance between the human agent and the caller, a position of the utterance within the conversation, and the word located before or after the utterance within the conversation;
classifying each utterance among the set of utterances, using a classifier, as an intent-bearing classification or a non-intent-bearing classification by generating multiple state sequences for each set of utterances, each state sequence including a plurality of states, each of the plurality of states corresponding to a respective utterance among the set of utterances and each of the plurality of states representing a probability that the respective utterance is intent-bearing, each utterance being associated with respective probabilities of multiple state sequences;
generating a ranking of each utterance based on a combination of the respective probabilities of the multiple state sequences, the ranking being a relative measure that the respective utterance is intent-bearing; and
selecting an utterance as being an intent-bearing utterance representing an intent of the conversation based on the ranking.

9. The non-transitory computer-readable medium according to claim 8, wherein in classifying each utterance of the set of utterances, the computer code when executed by a processor causes an apparatus to further:
wherein in selecting at least one utterance, the computer code when executed by a processor causes the apparatus to select the at least one utterance based on highest occurrence of intent classification among the probabilities being above a particular threshold.

* * * * *